United States Patent
Carbonini

(10) Patent No.: US 8,962,053 B2
(45) Date of Patent: Feb. 24, 2015

(54) DEVICE FOR HEATING AND/OR FROTHING A BEVERAGE

(75) Inventor: Carlo Carbonini, Villastanza di Parabiago (IT)

(73) Assignee: Rancilio Group SpA, Milan (IT)

( * ) Notice: Subject to any disclaimer, the term of this patent is extended or adjusted under 35 U.S.C. 154(b) by 351 days.

(21) Appl. No.: 12/523,955

(22) PCT Filed: Jan. 3, 2008

(86) PCT No.: PCT/IB2008/050004
§ 371 (c)(1),
(2), (4) Date: Jul. 21, 2009

(87) PCT Pub. No.: WO2008/090482
PCT Pub. Date: Jul. 31, 2008

(65) Prior Publication Data
US 2010/0047407 A1    Feb. 25, 2010

(30) Foreign Application Priority Data
Jan. 23, 2007  (EP) .................................. 07425030

(51) Int. Cl.
*A47J 31/32*    (2006.01)
(52) U.S. Cl.
USPC ............................ 426/443; 426/511; 426/519
(58) Field of Classification Search
USPC ......... 426/231, 474, 490–491, 519, 569, 443, 426/511; 99/293, 323.1
See application file for complete search history.

(56) References Cited

U.S. PATENT DOCUMENTS

| 5,207,148 A * | 5/1993 | Anderson et al. ............... 99/281 |
| 6,713,110 B2 * | 3/2004 | Imboden et al. ............... 426/511 |
| 2005/0005780 A1 * | 1/2005 | Beretta ........................... 99/453 |
| 2005/0118319 A1 * | 6/2005 | Green et al. .................. 426/564 |
| 2006/0272516 A1 * | 12/2006 | Carbonini ....................... 99/452 |

FOREIGN PATENT DOCUMENTS

| EP | 0 472 272 A2 | 2/1992 |
| WO | 2004/089173 A2 | 10/2004 |

\* cited by examiner

*Primary Examiner* — Steven Leff
(74) *Attorney, Agent, or Firm* — Sughrue Mion, PLLC

(57) ABSTRACT

The present invention relates to a device for heating and/or frothing a beverage (19), including: a first duct (21) connectable to an upstream steam source and having a first valve (31) configured to be opened and closed and to enable or prevent steam flow into the duct; a second duct (22) connectable to the upstream steam source and having a second valve (32) configured to be opened and closed and to enable or prevent steam flow into the duct; mixing means (14), which are connected to a common point of the first and second ducts (21, 22), are located downstream of the first duct (21) and the first valve (31) and downstream of the second duct (22) and the second valve (32) and are arranged to introduce and mix at least steam into the beverage. The device further comprises a Venturi assembly (22a) configured to operate by Venturi effect in order to mix air with steam in one the two ducts when the other of the two ducts is closed. Thanks to the device of the invention, heated beverages can be obtained in considerably quick times. The invention also relates to a method for heating and/or frothing beverages, as well as to an espresso coffee machine including the device.

8 Claims, 2 Drawing Sheets

DEVICE FOR HEATING AND/OR FROTHING A BEVERAGE

TECHNICAL FIELD

The present invention generally relates to a device for heating and/or frothing a beverage, e.g. milk, by means of steam.

More particularly, the present invention relates to a device applied to an espresso coffee machine for preparing hot milk or cappuccinos, and in the following description reference is made to such application, which is considered the preferred one.

BACKGROUND ART

The devices for heating and/or frothing milk are well known.

For instance, a device for preparing frothed beverages to be used in conjunction with a machine for preparing coffee and other hot beverages is known from document EP 0607759 A1.

The prior art device comprises a nozzle, which is controlled by a manual valve and which has a first chamber for steam inlet and a second chamber for steam outlet. The two chambers are connected through a passage, of reduced cross-sectional size, where a hole communicating with the surrounding environment is provided.

Steam flow through the passage with reduced cross-sectional size causes, by Venturi effect, a sufficient pressure decrease to ensure intake from the surrounding environment of air which, mixed with steam, exits through the second chamber and is introduced into the liquid, e.g. milk, frothing it.

A first problem of such a prior art is that the nozzle is effective for preparing frothed beverages, but it is ineffective for preparing non-frothed hot beverages, since the passage with reduced cross-sectional size generally entails either introduction of both air and steam into the beverage, thereby frothing it, or the need for an accurate control of the manual valve to limit steam inlet and the consequent air admission by Venturi effect.

Of course, vapour inlet control entails the further problem that the time necessary for preparing heated beverages is considerably higher than that required for preparing frothed beverages.

An automated machine for preparing espresso coffee, comprising a device for producing hot or frothed milk to be added to the espresso coffee, is known from document EP 0472272 A2.

The device of the prior art machine comprises two valves for steam introduction through a duct located upstream of a chamber with narrower cross-sectional size than the duct: The chamber, operating by Venturi effect, comprises an orifice for air intake from the surrounding environment. The two valves in the device have different flow rates.

Consequently, opening the valve with higher flow rate results in a greater steam flow into the chamber and hence enables preparing frothed milk, since pressure reduction in the chamber by Venturi effect is high.

Closing the valve with higher flow rate and opening the valve with lower flow rate on the contrary enables preparing hot milk, since pressure reduction in the chamber by Venturi effect is minimum and hence insufficient to enable air flow from the surrounding environment into the chamber.

Such a prior art, while enabling preparing both hot and frothed milk, has in any case the problem that preparing hot milk generally requires a very long time, in any case longer than that required for preparing frothed milk.

As the skilled in the art readily realises, such problem is very annoying in public places, where the beverage preparation time must be extremely short to provide for both short service time and good clients' satisfaction.

Essentially, the Applicant has realised that devices ensuring extremely reduced preparation time, especially in respect of hot beverages, irrespective of whether hot or frothed beverages are to be prepared, are not commercially available.

DISCLOSURE OF THE INVENTION

It is an object of the present invention to provide a device for heating and/or frothing a beverage, which device does not suffer from the drawbacks of the prior art.

The object is achieved by the device for heating and/or frothing a beverage as claimed.

The present invention also relates to a method for heating and/or frothing beverages, as well as to a machine for beverage preparation including the device.

The claims are integral part of the technical teaching provided here in respect of the invention.

According to a preferred embodiment, the device according to the invention comprises a first duct having a first opening and closing valve for making steam flow into the duct, and a second duct having both a second opening and closing valve for making steam flow into the duct, and a Venturi assembly configured to operate by Venturi effect when the first valve is closed.

According to a further feature of the present invention, the Venturi assembly is connected to a third valve configured to prevent operation of the Venturi assembly by Venturi effect in certain situations.

According to another feature of the present invention, the valve opening and closing is controlled by a control unit controlled by a command unit.

According to yet another feature of the present invention, the device includes a temperature detector device for detecting the instant temperature of the beverage, and the control unit is configured to selectively control, depending on the instant beverage temperatures, the valve opening and closing in order to prepare heated and/or frothed beverages.

BRIEF DESCRIPTION OF DRAWINGS

The above and other features and advantages of the present invention will become apparent from the following description of preferred embodiments, made for exemplifying and non-limiting purposes in connection with the accompanying drawings, in which elements denoted by a same or similar numerical reference correspond to components having the same or similar function and construction, and in which.

BEST MODE FOR CARRYING OUT THE INVENTION

Figure 1:
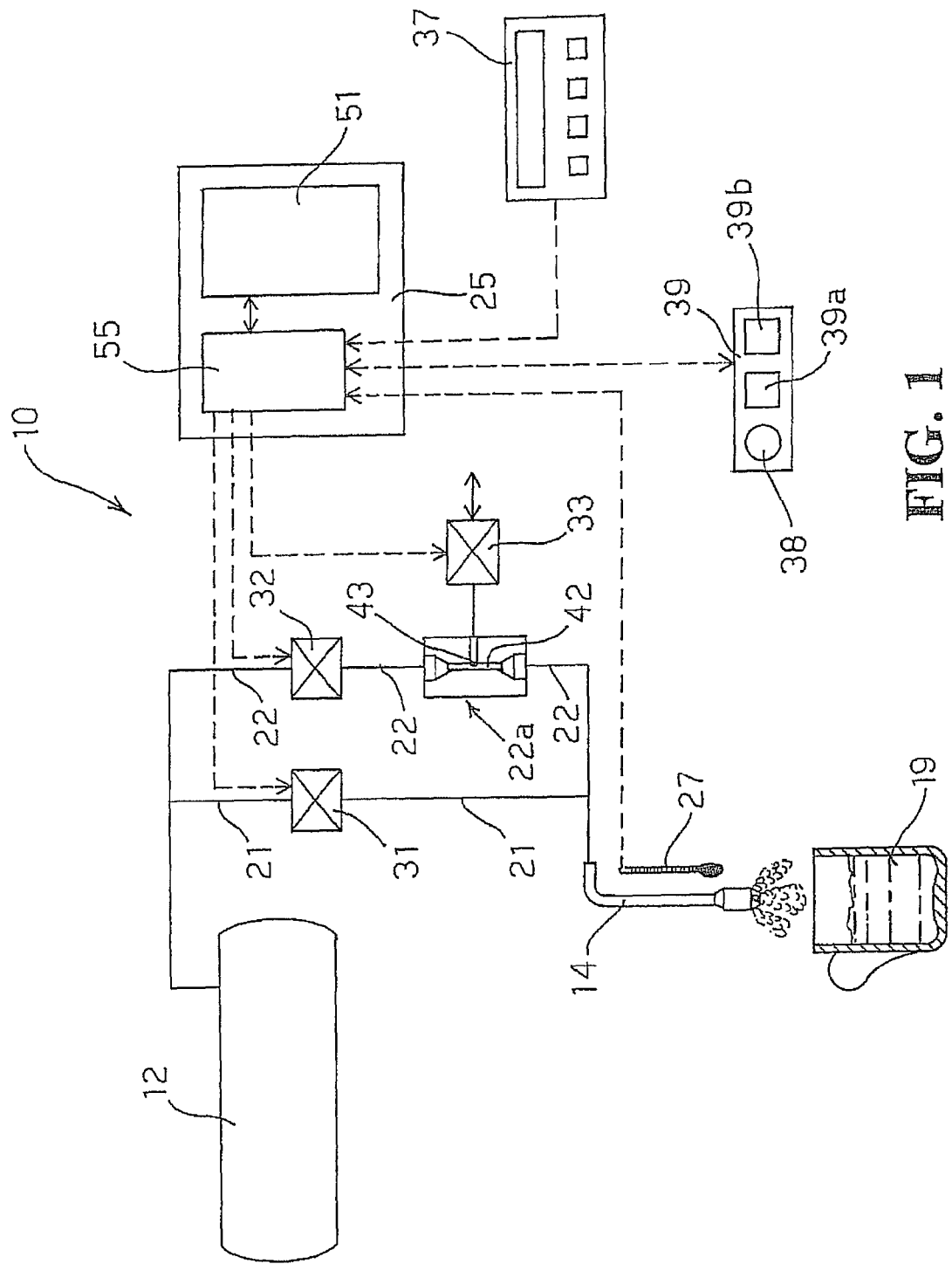
FIG. 1 is an overall diagram of the device according to the invention, in a preferred embodiment.

Referring to FIG. 1, a device 10 for heating and/or frothing a beverage 19, e.g. milk, applied to an espresso coffee machine, includes first and second ducts 21 and 22, respectively. The ducts have a common inlet connected to a boiler 12, of known type, arranged to generate, for instance, pressurised steam, and a common outlet connected to a mixing element 14, for instance a nozzle, of known type, arranged to introduce and mix pressurised steam, possibly including air, as it will be described in detail below, into the liquid 19 contained for instance in a container.

The device 10 also includes a control unit 25 and a command unit 39, connected to control unit 25 and arranged, for instance, to transmit commands from a user to control the operation of device 10.

As it will be described in detail below, control unit 25 is configured to control the operation of device 10 by means of programs developed during the device design phase and stored for instance in the same control unit 25.

The first duct 21 comprises a first valve 31, for instance an electrically-actuated valve with internal diameter 3.5 mm, the opening and closure of which can be controlled by control unit 25 in order to enable or prevent pressurised steam flow from boiler 12 to nozzle 14.

The second duct 22, preferably having internal diameter equivalent or substantially equivalent with that of the first duct, comprises, in an upstream section, a second valve 32, for instance an electrically-actuated valve with internal diameter 3.5 mm, the opening and closure of which can be controlled by control unit 25 in order to enable or prevent pressurised steam flow from boiler 12 to nozzle 14. In a downstream section, towards nozzle 14, the duct comprises a duct element 22a preferably operating by Venturi effect.

Figure 2:
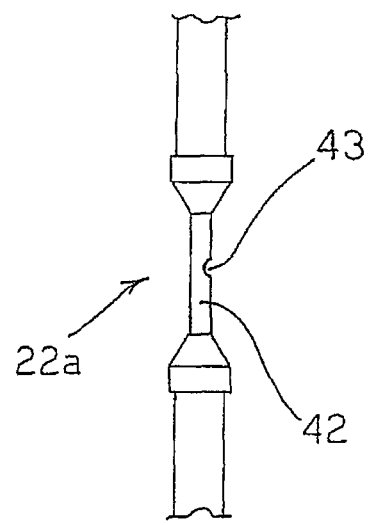
FIG. 2 shows a detail of the device of FIG. 1 in a further embodiment.

The duct element 22a (Venturi assembly or Venturi) comprises a duct length 42, for instance with diameter 2.5 mm, upstream and downstream connected to the second duct 22, and an orifice 43, for instance with diameter 1.5 mm, formed in duct length 42 and directly communicating with the surrounding environment at atmospheric pressure, as shown in FIG. 2.

According to a preferred embodiment, shown in FIG. 1, the orifice is connected to a valve 33 (Venturi valve), for instance an electrically-actuated valve with diameter equal to the orifice diameter, the opening and closure of which can be controlled by control unit 25 in order to enable or not to enable air inlet from the surrounding environment into Venturi 22a or, conversely, to enable or not to enable steam outlet from orifice 43 towards the surrounding environment.

According to a variant of the preferred embodiment, Venturi valve 33 is for instance a nonreturn valve arranged to prevent the only steam outlet from orifice 43 towards the surrounding environment. Of course, as the skilled in the art can readily realise, such a valve needs not to be controlled by control unit 25.

Figure 3:
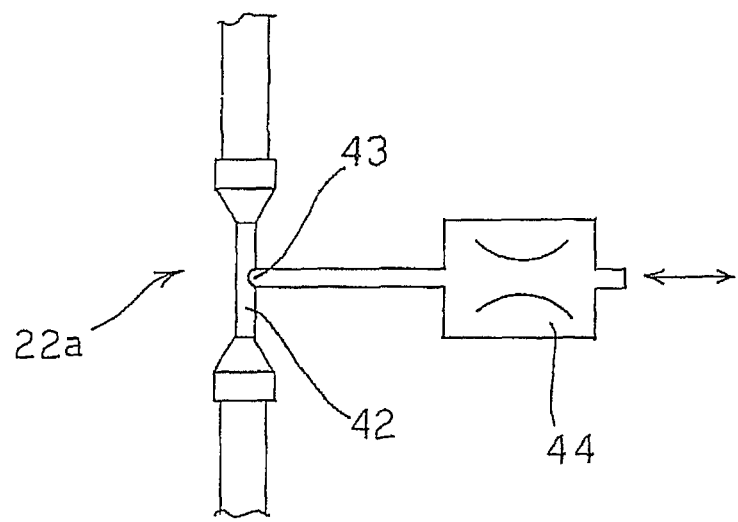
FIG. 3 shows a detail of the device of FIG. 1 in a third embodiment.

According to a third embodiment, orifice 43 is connected to a further duct length 44 (FIGS. 1, 3) with smaller diameter than orifice 43, e.g. diameter 0.5 mm.

Such an embodiment, as it will be described in detail below, is capable of reducing the air amount admitted through Venturi 22a and enables attaining a finer frothing than attainable with orifice 43.

In all embodiments, a temperature detecting device 27, e.g. a temperature sensor or thermometer, is preferably provided, which is connected, in known manner, to control unit 25 and is arranged to transmit to control unit 25 signals representing the temperature of liquid 19 in which nozzle 14 is immersed for preparing heated and/or frothed beverages.

Control unit 25 of device 10 is configured, as it will be described in detail below, to control the operation of device 10 through programs developed during the device design phase and stored for instance in the same control unit 25. It preferably comprises a microcontroller 51 of known type, e.g. a microcontroller model MB90F4097G by company Fujitsu, connected to or including a multiple-port input-output interface (I/O interface) 55.

In the preferred embodiment, I/O interface 55 is connected to the first and second valves 31 and 32, respectively, to the temperature detecting device (thermometer) 27, to the command unit 39 and the Venturi valve 33, if provided.

Command unit 39, e.g. a two-key keyboard, is arranged to transmit to control unit 25, e.g. upon actuation of one of the keys, commands for starting and/or stopping the various functions of device 10. More particularly, in the preferred embodiment, command unit (keyboard) 39 comprises a first key 39a intended to command the control unit 25 to prepare a heated and frothed beverage, and a second key 39b correspondingly intended to command to prepare a heated beverage. Most preferably, keyboard 39 is associated with or includes a signalling unit 38, e.g. a buzzer or a LED, connected to control unit 25 and arranged to audibly and/or visually signal the completion of the command sent through keys 39a or 39b, as described in detail below.

Device 10 is preferably associated also with a parameter setting unit 37, for instance a keyboard with display, of known type, connected to control unit 25 and arranged to set operation parameters of device 10, to be stored for instance in the control unit.

The operation of the device described above is disclosed hereinafter with reference to the embodiment shown in FIG. 1, including Venturi valve 33 controlled by control unit 25.

Moreover, in describing the operation, a starting condition is assumed where the first and second valves 31 and 32 and Venturi valve 33 are closed and nozzle 14 is immersed in the beverage or liquid (milk) 19 contained in a container.

Lastly, it is also assumed that boiler 12 operates, for instance, in a pressure range from 0.8 to 1.4 bars, and that a maximum milk heating temperature is envisaged, e.g. a temperature of 70° C. Of course, in other embodiments, the values of the above quantities may be different from those indicated, without departing from the scope of what is described and claimed.

The operation of device 10 for preparing a heated and frothed beverage, e.g. milk, is as follows.

Upon actuation, in a first phase, of key 39a intended to start preparation of heated and frothed milk, control unit 25, according to the programs developed during the design phase of device 10, keeps Venturi valve 33 closed and commands the opening of both the first valve 31 and the second valve 32, which therefore enable a quick steam flow from nozzle 14 and a correspondingly quick milk heating.

During such phase, if Venturi valve 33 is missing, being both valves 31 and 32 open, an over-pressure, estimated for instance at 50 mbar above atmospheric ambient pressure, is present in Venturi 22a and prevents air from flowing from the surrounding environment into Venturi 22a.

During such phase, if the nonreturn valve is provided, steam flow towards the surrounding environment is in any case prevented.

In a second phase, for instance upon thermometer 27 signalling to control unit 25 a first predetermined temperature, e.g. a temperature of 30°, control unit 25, according to the programs developed during the design phase of device 10, commands the closure of the first valve 31 and the opening of Venturi valve 33.

Due to the closure of the first valve 31, a depression capable of making air flow from the surrounding environment into steam, is generated in Venturi 22a.

The Applicant has experimentally detected that, taking into account the pressure values assumed in boiler 12, pressure in the Venturi is in the range 260 to 130 mbar below atmospheric ambient pressure, and is such as to enable air flow from the surrounding environment into duct length 42.

Air mixed with steam arrives at nozzle 14 and hence to milk 19 contained in the container, where milk begins frothing and grows by embodying small air bubbles at its interior. In such phase, steam in the air/steam mixture leaving nozzle 14 continues heating milk, of course at lower speed than in the first phase, since steam arrives from second duct 22 only. Yet, such slow heating condition is ideal for producing a high-quality froth or cream.

In a third phase, for instance upon thermometer 27 signalling to control unit 25 a second predetermined temperature, e.g. a temperature of 55°, control unit 25, according to the programs developed during the design phase of device 10, commands the opening of the first valve 31 and the closure of Venturi valve 33.

In such phase, similarly to the first phase, a strong steam flow to the nozzle and a correspondingly high speed of milk heating occur.

During such phase, if Venturi valve 33 is missing, the indications already provided for the first phase still apply.

In a fourth phase, for instance upon thermometer 27 signalling to control unit 25 the maximum milk heating temperature, control unit 25, according to the programs developed during the design phase of device 10, commands the closure of the first and second valves 31 and 32, respectively, and signals the completion of frothed milk preparation through signalling unit 38.

The operation of device 10 for preparing a heated beverage, e.g. milk, is as follows.

Upon actuation in a first phase of key 39*b* intended to start preparation, for instance, of heated milk, control unit 25, according to the programs developed during the design phase of device 10, keeps Venturi valve 33 closed and commands the opening of both the first valve 31 and the second valve 32, which therefore enable the quick steam flow from nozzle 14 and a correspondingly quick milk heating, similarly to what has been already described for the first phase of frothed milk preparation.

During such phase, all indications already given for the first phase of frothed milk preparation apply.

In a second phase, for instance upon thermometer 27 signalling to control unit 25 the maximum milk heating temperature, control unit 25, according to the programs developed during the design phase of device 10, commands the closure of the first and second valves 31 and 32, respectively, and signals the completion of heated milk preparation through signalling unit 38.

According to the above description, in the preferred embodiment, at least three operating temperatures, stored for instance in the control unit, are envisaged for preparing frothed milk:

a first operating temperature t1, corresponding to the temperature, e.g. 30°, at which air introduction into steam starts;

a second operating temperature t2, corresponding to the temperature, e.g. 55°, at which air introduction into steam ends;

a third operating temperature t3, e.g. 70°, corresponding to the maximum milk heating temperature.

According to one of the three possible embodiments, it is envisaged that the third temperature t3 is set and possibly stored into the control unit through parameter setting unit (ancillary keyboard) 37, and that the first and second temperatures, t1 and t2, respectively, are determined by control unit 25 and stored based on froth level parameters (e.g. low, medium, high) set through ancillary keyboard 37.

As the skilled in the art can readily realise, as the froth level having been set increases, the control unit is arranged to determine, according to the programs developed during the design phase of device 10, increasing temperature intervals t1-t2, so as to broaden the temperature range and, consequently, to increase the time during which air is mixed with steam.

Of course, other embodiments provide for the possibility of directly setting all temperatures t1, t2 and t3, respectively.

As the skilled in the art can readily realise, the provision of Venturi valve 33 enables, by keeping Venturi valve 33 always closed, a variable speed heating of the beverage, for instance, by setting heating speed parameters (e.g. low, medium and high speed) through ancillary keyboard 37.

Actually, by keeping Venturi valve always closed 33 and by controlling the opening and the closure of the first and second valves 31 and 32, respectively, the beverage heating speed can be changed without the beverage being frothed.

Such a feature is particularly useful when preparation of hot beverages, such as hot chocolate or mulled wine, is desired. In such cases, indeed, a too high heating speed could negatively affect the quality of the result, whereas higher heating speeds can be used for other beverages.

The preferred embodiment provides for having a thermometer associated with nozzle 14 and connected to control unit 25.

Of course, in other embodiments, the thermometer can be missing and the control for preparing e.g. frothed beverages can be performed by the control unit based on parametrical times, corresponding for instance, to the time necessary for reaching temperature t1, the time necessary for reaching temperature t2 and the time necessary for reaching temperature t3. The same method can be applied also to preparing heated beverages.

Of course, obvious changes and modifications can be made to the above description, in respect of sizes, shapes, materials, components, circuit elements and connections, as well as in respect of the details of the disclosed construction and the operating method, without departing from the invention as defined in the following claims.

The invention claimed is:

1. A method for preparing beverages by a device providing a steam source, comprising a first duct downstream of said steam source and directly connected to the steam source, said first duct having a first valve along the first duct, a second duct downstream of said steam source and directly connected to the steam source, said second duct having a second valve along the second duct and a Venturi assembly downstream of said second valve and along the second duct, whereby said Venturi assembly is upstream and downstream connected to the second duct, said Venturi assembly being comprised of a duct length, said duct length (i) having a first end directly connected downstream of a first portion of said second duct and a second end directly connected upstream of a second portion of said second duct, (ii) having a diameter lower than the diameter of the second duct, and (iii) being configured to operate by Venturi effect by communicating with the surrounding environment to introduce air at atmosphere pressure into said duct length, said first and second ducts having substantially the same internal diameter and being connected to a downstream mixing means immersed into a liquid contained into a container, said method comprising the steps of:

opening said first and second valves for preparing hot beverages by introducing steam emitted from the downstream mixing means into the liquid contained in the container; and closing said first valve to cause said Venturi assembly downstream of said second valve to operate by Venturi effect to mix into said second duct air with steam from said steam source for preparing hot and frothed beverages by introducing the mixed air and steam into the liquid contained in the container.

2. The method as claimed in claim 1, wherein said opening said first and second valves, and closing said first valve, respectively, comprise actuating command means connected to a control unit configured to control the opening and closing of said first and second valves.

3. The method as claimed in claim 1, further comprising:
detecting a predetermined temperature in proximity of said beverage;
wherein said closing said first valve comprises closing said first valve in response to detecting the predetermined temperature.

4. The method as claimed in claim 3, further comprising:
detecting a second predetermined temperature in proximity of said beverage, said second predetermined temperature higher than said first predetermined temperature;
opening said first valve in response to detecting said second predetermined temperature;
detecting a third predetermined temperature value, said third predetermined temperature higher than said second predetermined temperature; and
closing said first valve and said second valve in response to detecting said third predetermined temperature.

5. The method as claimed in claim 1, wherein said closing said first valve comprises closing said first valve and controlling air admission into said Venturi assembly through a third valve.

6. The method as claimed in claim 1, wherein said first duct and said second duct are separated from each other upstream of said Venturi assembly and are connected together downstream of said Venturi assembly.

7. The method as claimed in claim 1, wherein said first duct and said second duct are directly connected to said steam source at a common inlet downstream from said steam source.

8. The method as claimed in claim 1, wherein said duct length of said Venturi assembly is configured to communicate with the surrounding environment to introduce air at atmosphere pressure through an orifice formed in a side surface of said duct length.

* * * * *